United States Patent Office 3,836,656
Patented Sept. 17, 1974

3,836,656
SUBSTITUTED PURINES AS HYPOLIPIDEMICS
Mario G. Buzzolini, Morristown, N.J., assignor to Sandoz-Wander, Inc., Hanover, N.J.
No Drawing. Filed Feb. 7, 1972, Ser. No. 224,327
Int. Cl. A61k 27/00
U.S. Cl. 424—253
8 Claims

ABSTRACT OF THE DISCLOSURE

The d-isomer of optically active 3-(6-amino-9H-purin-9-yl)-1,2; propanediol is prepared from d-9-[(2-substituted and 2,2 - disubstituted-1,3-dioxol-4-yl)methyl]adenines and both the product isomer and starting materials are usful as hypolidemic agents.

This invention relates to the pharmaceutical activity of the d-isomer of substituted purine compounds. More particularly, this invention concerns the use of d-3-(6-amino-9H-purin-9-yl)-1,2-propanediol and novel derivatives of this isomer in the treatment of lipidemia in animals. The invention also relates to a process for preparing the isomer from the novel derivatives.

The active agents with which this invention is concerned may be represented by the following structual formula:

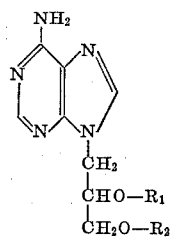

where $R_1$ and $R_2$ each represent hydrogen or
$R_1$ and $R_2$ together represent

where $R_3$ and $R_4$ each independently represent lower alkyl, i.e., alkyl having 1 to 4 carbon atoms, e.g., methyl, ethyl, isopropyl and the like or
one $R_3$ or $R_4$ is hydrogen and the other is phenyl The compound of formula I in which $R_1$ and $R_2$ are both hydrogen is known in racemic mixture form. The d-isomer may be isolated from the racemic mixture using standard techniques in addition to being prepared by the procedure described below. The present invention contemplates only the novel use of this compound in pharmaceutical applications, particularly as a hypolidemic agent.

The d-isomer of the compound of formula (I) in which $R_1$ and $R_2$ are both hydrogen may be prepared in accordance with the following reaction scheme:

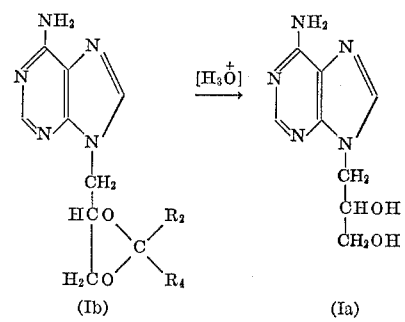

where $R_3$ and $R_4$ are as defined above.

The compounds of formula (Ia) are prepared by treating the d-isomer of a compound of formula (Ib) with an acid in a aqueous solvent. The acid can be a mineral acid such as hydrochloric acid, sulfuric acid, and the like or an organic acid such as acetic acid, trichloroacetic acid and the like. The particular acid used is not critical but hydrochloric acid is preferred. The aqueous solvent can be water or a mixture or water and a water soluble organic solvent, e.g., the lower alkanols. The preferred solvent is water, although the particular solvent used is not critical. The temperature of the reaction is also not critical, but it is preferred that the reaction be carried out between 20° to 30° C. The reaction is normally run for from 2 to 24 hours for optimum results. The product is recovered by conventional techniques, e.g., crystallization.

The compounds of formula (Ib) are novel and may be prepared in accordance with the following reaction scheme:

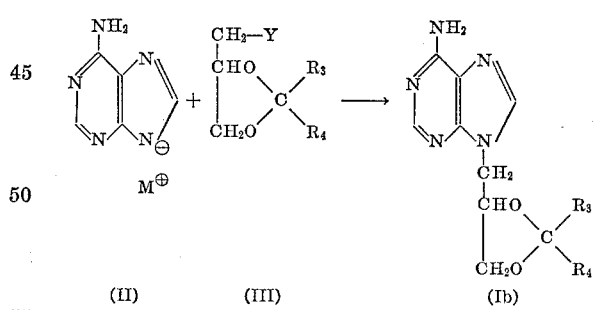

where

M is an alkali metal
Y is a leaving group and
$R_3$ and $R_4$ are as defined above The compounds of formula (Ib) are prepared by treating a compound of formula (II) with a d-isomer of a compound of formula (III). The alkali metal in the compound of formula (II) is preferably sodium or potassium. The compounds of formula (II) are prepared by treating adenine with an alkali metalating agent which can be an alkali metal hydride, e.g., sodium hydride, potassium hydride and the like; an alkali metal amide, e.g., sodium amide, potassium amide, and the like, an alkali metal alcoholate such as sodium ethanolate or potassium ethanolate or an alkali metal carbonate such as sodium carbonate or potassium carbonate. The particular leaving group used in the compound of formula (III) is not critical and can be a tosylate, mesylate, and the like, preferably a tosylate. Although a solvent is not critical, the reaction is preferably carried out in an inert solvent, for example, dimethylacetamide, dimethylsulfoxide, dimethylformamide, benzene, toluene, hexane, and the like. Dimethylformamide is especially preferred. The reaction is preferably run at a temperature of from about 70 to 120° C., especially between about 80 to 90° C., although the temperature is not critical. The time also is not critical, but for optimum results, the reaction should be run for about 2 to 48 hours. The product is recovered by conventional techniques, e.g., recrystallization.

The compound of formula (II) and many of the compounds of formula (III) are known and may be prepared by techniques described herein in the case of compound (II) or as disclosed in the literature in the case of compound (III). The compounds of formula (III) not specifically disclosed in the literature may be prepared by analogous methods using known starting materials.

As previously indicated, the compounds of formula (I) are useful because they possess pharmacological activity in animals, particularly as hypolipidemic agents, as indicated by the fall in cholesterol and triglyceride levels in male albino Wistar rats weighing 110–130 g. initially. The rats are maintained on drug-free laboratory chow diet for seven days and then divided into groups of 8 to 10 animals. Each group with the exception of the control is then given orally 30 milligrams per kilogram of body weight per diem of the compound for six days. At the end of this period, the animals are anesthetized with sodium hexobarbital and bled from the carotid arteries. Serum or plasma samples are collected, and 1.0 ml. samples of the serum are added to 9.0 ml. redistilled isopropanol. Two autoanalyzer cupsful of a mixture of zeolite-copper hydroxide and Lloydds reagent (Kessler, G., and Lederer, H., 1965, Technicon Symposium, Mediad Inc., New York, 345–347) are added, and the mixture is shaken for one hour. Cholesterol and triglyceride levels are determined simultaneously on the same sample by Technicon N 24 A (cholesterol) and N-78 (triglyceride) methodology. The mean total serum cholesterol levels are then computed and the hypocholesterolemic activity is expressed as the fall in cholesterol levels as a percentage of the control level. The change in serum triglyceride levels induced by the drug is computed as a percentage of the control triglyceride levels.

For such usage, the compounds (I) may be administered orally or parenterally as such or admixed with conventional pharmaceutical carriers. They may be administered in such forms as tablets, dispersible powders, granules, capsules, syrups and elixers and parenterally as solutions, suspensions, dispersions, emulsions and the like, e.g. a sterile injectable aqueous solution. The compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutically acceptable excipients, e.g., inert diluents, such as calcium carbonate, sodium carbonate, lactose and talc, granulating the disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and absorption in the gastro-intestinal tract and thereby provide a sustained action over a longer period. Similarly, oral liquids, e.g. suspensions may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-o-hydroxybenzoate). Capsules may contain the active ingredient alone or admixed with an inert solid diluent, e.g., calcium carbonate, calcium phosphate and kaolin. The injectable compositions are formulated as known in the art. These pharmaceutical preparations may contain up to about 90% of the active ingredient in combination with the carrier or adjuvant.

The hypolipidemic effective dosage of compounds (I) employed in the alleviation of lipidemia may vary depending on the particular compound employed and the severity of the condition being treated. However, in general, satisfactory results are obtained when the compounds of formula (I) are administered at a daily dosage of from about 0.7 milligrams to about 250 milligrams per kilogram of animal body weight, preferably given in divided doses two to four times a day, or in sustained release form. For most large mammals, the total daily dosage is from about 50 milligrams to about 2000 milligrams. Dosage forms suitable for internal use comprise from about 12.5 to about 1000 milligrams of the active compound in intimate admixture with a solid or liquid pharmaceutically acceptable carrier of diluent.

The preferred pharmaceutical compositions from the standpoint of preparation and ease of administration are solid compositions, particularly hard-filled capsules and tablets containing from about 50 to 250 milligrams of the active ingredient.

EXAMPLE 1 d-3-(6-amino-9H-purin-9-yl)-1,2-propanediol

Step A: d-9-[(2,2-dimethyl-1,3-dioxol - 4 - yl)methyl] adenine. The sodium salt of adenine is prepared by stirring a suspension of 8.96 g. of adenine and 3.1 g. of sodium hydride (in mineral oil) in 100 ml. dimethylformamide at 80–85° for 1½ hrs. To this suspension is added dropwise at 80–85° a solution of 19.0 g. of (+) 1,2-O-isopropylideneglycerol-1-p-tosylate in 100 ml. dimethylformamide, and stirring is continued at the same temperature for 30 hrs. After cooling the solution is evaporated to dryness in vacuo and the resulting residue is treated with 50 ml. of water and extracted three times with a mixture of chloroform/methanol (9:1). The organic layers are combined, dried over anhydrous magnesium sulfate and evaporated to dryness. The resulting crude white solids are recrystallized from methylene chloride/methanol yielding white crystals of d-9-[(2,2-dimethyl-1,3-dioxol-4-yl)methyl)] adenine (m.p. 210–212°;

$[\alpha]_{H_2O} = -23.53°$)

Following the above procedure but using an equivalent amount of (+) 1,2-O-benzylideneglycerol-1-p-tosylate in place of the (+) 1,2-O-isopropylideneglycerol-1-p-tosylate used therein, there is obtained d-3-[(2-phenyl-1,3-dioxol-4-yl)methyl]adenine.

Step B: 3-(6-amino-9H-purin-9-yl)-1,2-propanediol. A suspension of 5.0 g. of 9-[(2,2-dimethyl-1,3-dioxol-4-yl) methyl]adenine in 150 ml. 0.1 N hydrochloric acid is stirred at 75–80° for 8 hrs. The resulting clear solution is neutralized with Amberlite IR-45(OH) and filtered. The filtrate is evaporated to dryness in vacuo and the white crude residue is recrystallized from ethanol-water yielding white crystals of d-3-(6-amino-9H-purin-9-yl)-1,2-propanediol (m.p. 213–214°, $[\alpha]_{H_2O} = -44.53°$).

When the above process is carried out using d-3-[(2-phenyl-1,3-dioxol-4-yl)methyl] adenine in place of the d-3-[(2,2-dimethyl-1,3-dioxol-4-yl)methyl]adenine used therein, there is again obtained 3-(6-amino-9H-purin-9-yl)-1,2-propanediol.

EXAMPLE 2

Tablets and capsules suitable for oral administration which contain the following ingredients may be prepared by conventional techniques. Such tablets and capsules are useful in treating lipidemia at a dose of one tablet 2 to 4 times a day.

| Ingredients | Weight (mg.) | |
|---|---|---|
| | Tablet | Capsule |
| d-3-(6-amino-9H-purin-9-yl)-1,2-propanediol | 50 | 100 |
| Tragacanth | 10 | |
| Lactose | 197.5 | 200 |
| Corn starch | 25 | |
| Talcum | 15 | |
| Magnesium stearate | 2.5 | |

EXAMPLE 3

The following formulations for syrups or elixirs containing an effective amount of active compound may be formulated using conventional methods. The syrup or elixir may be administered at a dosage of one or two tablespoons once or twice a day.

| Ingredients | Percent by weight | |
|---|---|---|
| | Syrup | Elixir |
| d-3(6-amino-9H-purin-9-yl)-1,2-propanediol | 0.5-3.5 | 0.5-3.5 |
| Buffering system | (1) | (1) |
| Sodium benzoate | 0.1-0.5 | 0.1-0.5 |
| Flavoring agent | 0.01-0.2 | 0.01-0.2 |
| Water | 20-40 | 5-20 |
| Simple syrups U.S.P | 30-70 | 0 |
| Sorbitol solution (70%) | 10-30 | 20-60 |
| Certified dye | 0.5-2 | 0.5-2 |
| Alcohol | 0 | 2.5-20 |
| Methyl paraben | 0 | 0.05-0.1 |
| Propyl paraben | 0 | 0.05-0.1 |
| Sodium saccharin | 0 | 0.01-0.08 |

¹ Quantity sufficient to adjust pH.

EXAMPLE 4

The following ingredients are dissolved in water for injection. The resulting solution is filtered through an appropriate medium to form a clear solution, and is then autoclaved to render it sterile. The solution may be administered at a dosage of 1 or 2 milliliters once or twice a day.

Ingredient: Weight (percent)
d-3-(6-amino-9H-purin-9-yl)-1,2-propanediol ____ 10
Sodium alginate ____ 0.5
Buffering Agent ____ As desired
Lecithin ____ 0.5
Sodium chloride ____ As desired
Water, q.s. to 1 ml.

EXAMPLES 5 AND 6

Tablets and capsules containing the ingredients indicated below may be prepared by conventional techniques and are useful in treating lipidemia at a dose of one tablet or capsule 2 to 4 times a day.

| Ingredients | Weight (mg.) | |
|---|---|---|
| | Tablet | Capsule |
| d-9-1(2,2-dimethyl-1,3-dioxol-4yl)methyl]adenine | 50 | 50 |
| Tragacanth | 10 | |
| Lactose | 197.5 | 250 |
| Corn starch | 25 | |
| Talcum | 15 | |
| Magnesium stearate | 2.5 | |

EXAMPLE 7

The following formulations for syrups or elixirs containing an effective amount of active compound may be formulated using conventional methods. The syrup or

| Ingredients | Percent by weight | |
|---|---|---|
| | Syrup | Elixir |
| d-9-1(2,2-dimethyl-1,3-dioxol-4-yl)methyl]adenine | 0.5-3.5 | 0.5-3.5 |
| Buffering system | (1) | (1) |
| Sodium benzoate | 0.1-0.5 | 0.1-0.5 |
| Flavoring agent | 0.01-0.2 | 0.01-0.2 |
| Water | 20-40 | 5-20 |
| Simple syrups U.S.P | 30-70 | 0 |
| Sorbitol solution (70%) | 10-30 | 20-60 |
| Certified dye | 0.5-2 | 0.5-2 |
| Alcohol | 0 | 2.5-20 |
| Methyl paraben | 0 | 0.05-0.1 |
| Propyl paraben | 0 | 0.05-0.1 |
| Sodium saccharin | 0 | 0.01-0.08 |

¹ Quantity sufficient to adjust pH.

EXAMPLE 8

The following ingredients are dissolved in water for injection. The resulting solution is filtered through an appropriate medium to form a clear solution and is then autoclaved to render it sterile. The solution may be administered at a dosage of one or two milliliters once or twice a day.

Ingredient: Weight (percent)
d-9-[(2,2-dimethyl-1,3-dioxol-4-yl)methyl]adenine ____ 10
Sodium Alginate ____ 0.5
Buffering Agent ____ As desired
Lecithin ____ 0.5
Sodium Chloride ____ As desired
Water, q.s. to 1 ml.

What is claimed is:

1. A method for treating lipidemia, which comprises orally administering to a mammal in need of said treatment a hypolipidemic effective amount of a d-isomer of a compound of the formula:

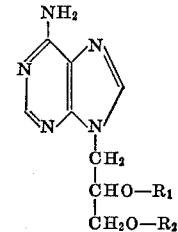

where $R_1$ and $R_2$ each represent hydrogen.

2. The method of claim 1 wherein the compound is administered at a daily dose of from about 50 milligrams to about 2000 milligrams.

3. The method of claim 1 wherein the compound is administered in a unit dosage form comprising said compound to the extent of from about 12.5 milligrams to about 1000 milligrams per unit dosage.

4. The method of claim 1 in which the compound is d-3-(6-amino-9H-purin-9-yl)-1,2-propanediol.

5. A pharmaceutical composition in dosage form for the treatment of lipidemia comprising as an active ingredient thereof a d-isomer of a compound of the formula

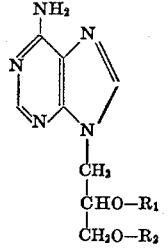

where $R_1$ and $R_2$ are as defined in claim 1 and a pharmaceutically acceptable carrier therefor, said compound being present in said composition in an amount of about 12.5 to about 1000 milligrams.

6. The composition of claim 5 wherein the carrier is a solid orally ingestible carrier and the active ingredient is present in said composition to the exent of from about 50 to 250 milligrams per unit dosage.

7. A tablet for the treatment of lipidemia in mammals comprising as an active ingredient thereof a compound of the formula

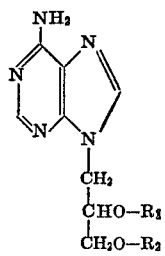

where $R_1$ and $R_2$ are as defined in claim 1, and said compound being present in said tablet to the extent of from about 50 to 250 milligrams per unit dosage.

8. The composition of claim 5 in which the active ingredient is d-3-(6-amino-9H-purin-9-yl)-1,2-propanediol.

References Cited

J. Chem. Soc. (1960) 327–331, London.

Derwent Abstract: 12638R of Belgian Patent, 737,949, (Feb. 25, 1970).

ALBERT T. MEYERS, Primary Examiner

F. E. WADDELL, Asssistant Examiner

U.S. Cl. X.R.

260—252